No. 830,551. PATENTED SEPT. 11, 1906.
A. A. WOOD.
MACHINE FOR SEALING BOTTLES.
APPLICATION FILED NOV. 14, 1903.

Witnesses
Inventor
Albert A. Wood.
by
Attorneys

No. 830,551. PATENTED SEPT. 11, 1906.
A. A. WOOD.
MACHINE FOR SEALING BOTTLES.
APPLICATION FILED NOV. 14, 1903.

Witnesses
A. J. Judge
M. H. Young

Inventor
Albert A. Wood,
by Geo. W. T. Howard
Attorneys

No. 830,551. PATENTED SEPT. 11, 1906.
A. A. WOOD.
MACHINE FOR SEALING BOTTLES.
APPLICATION FILED NOV. 14, 1903.

Witnesses
Inventor
Albert A. Wood
by W. T. Howard.
Attorneys

UNITED STATES PATENT OFFICE.

ALBERT A. WOOD, OF ATLANTA, GEORGIA.

MACHINE FOR SEALING BOTTLES.

No. 830,551. Specification of Letters Patent. Patented Sept. 11, 1906.

Application filed November 14, 1903. Serial No. 181,188.

*To all whom it may concern:*

Be it known that I, ALBERT A. WOOD, of the city of Atlanta, in the county of Fulton and State of Georgia, have invented certain Improvements in Machines for Sealing Bottles, of which the following is a specification.

In the description of the said machine which follows, reference is made to the accompanying drawings, forming a part hereof, and in which—

Figure 3:
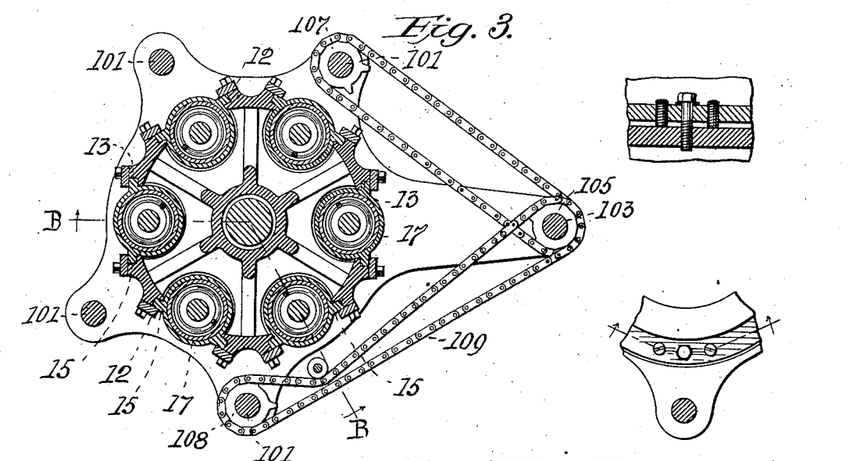
Fig. 3 is a horizontal section of Fig. 1, taken on the line C C.

Referring now to the drawings, 1 is the columnar base of the machine, having at its upper end four horizontally-extending perforated lugs 2 and an arm 3, a top view of which is shown in Fig. 3. Secured in the upper end of the columnar base 1 is a central fixed vertical shaft 5.

7 is a cam fastened to the top of the columnar base 1, the operative parts of which consist of the upper and lower sides of a circumferential groove 9. (See Fig. 2.)

10 is a turret arranged to rotate about the central shaft 5 and upon the hub portion of the cam 7. (See Fig. 2.) Antifriction-balls are employed at the junction of these parts.

The turret 10 has six radially-extending arms 11, (shown in section in Fig. 3,) which terminate in plates rabbeted at their edges, the rabbets, together with strips 12, forming grooves 13, within which slide the wings 15 of cylinders 17, forming parts of certain bottle-carrying devices, hereinafter described.

Secured to or forming a part of the upper end of the turret 10 is a circumferentially-toothed disk 19, having six circular apertures 20 in vertical alinement with the cylinders 17, in which apertures are situated the devices for turning in the flanges of the sealing-caps under the heads of the bottles. These devices will be hereinafter described as "sealing-heads" and denoted as entireties by 21.

Figure 10:
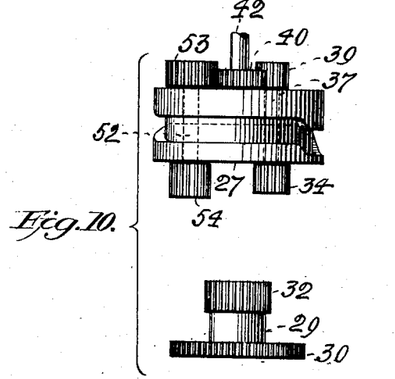
Fig. 10 is an elevation of the upper cam, together with certain connections thereof, which are shown as detached.

22 is a fixed spacing-sleeve having a flange at its bottom which rests on an annular plate 23, which in turn rests on a shoulder 24 formed by reducing the diameter of the central fixed shaft 5. (See Fig. 2.) This sleeve extends to the under side of the upper fixed cam 27. (Shown in elevation in Fig. 10 and in section in Fig. 2.) Antifriction-balls are introduced between the annular plate 23 and a similar plate forming the upper extremity of the central part of the rotary turret 10.

Over the sleeve 22 is placed a loose sleeve 29, (see Figs. 2 and 10,) having a spur gear-wheel 30 at its lower end which meshes with the toothed circumference of a part of the sealing-heads 21. (See Fig. 2.) The upper end of the sleeve 29 carries a tight pinion 32 (see Fig. 10) in mesh with another pinion 34 at the lower end of a short shaft 37, adapted to rotate loosely in the upper cam 27. At the upper end of this short shaft 37 is another tight pinion 39, which is in mesh with and driven by the spur gear-wheel 40 at the lower end of the driving-shaft 42.

From the foregoing it will be understood that by means of the gearing described the rotation of the driving-shaft 42 effects the rotation of all the rotary elements of the sealing-heads independently of their position with reference to the fixed parts of the machine, such, for instance, as the two cams, the central shaft, and the base of the machine.

Figure 7:
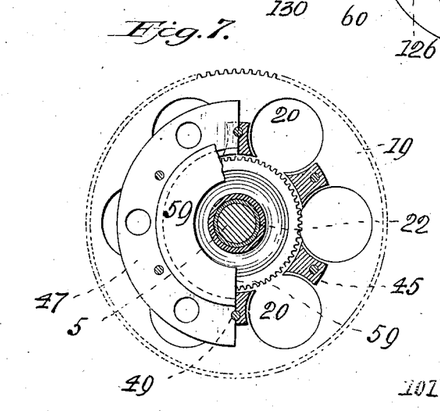
Fig. 7 is a horizontal section of Fig. 2, taken on the line G G.

On the upper surface of the exteriorly-toothed disk 19 and situated between the circular apertures 20 therein (see Figs. 2 and 7) are lugs 45, upon which are fastened an annular plate 47, and to this plate is secured by bolts 49 the turret-head 50, which is an annular device with its inner circumference toothed.

Figure 5:
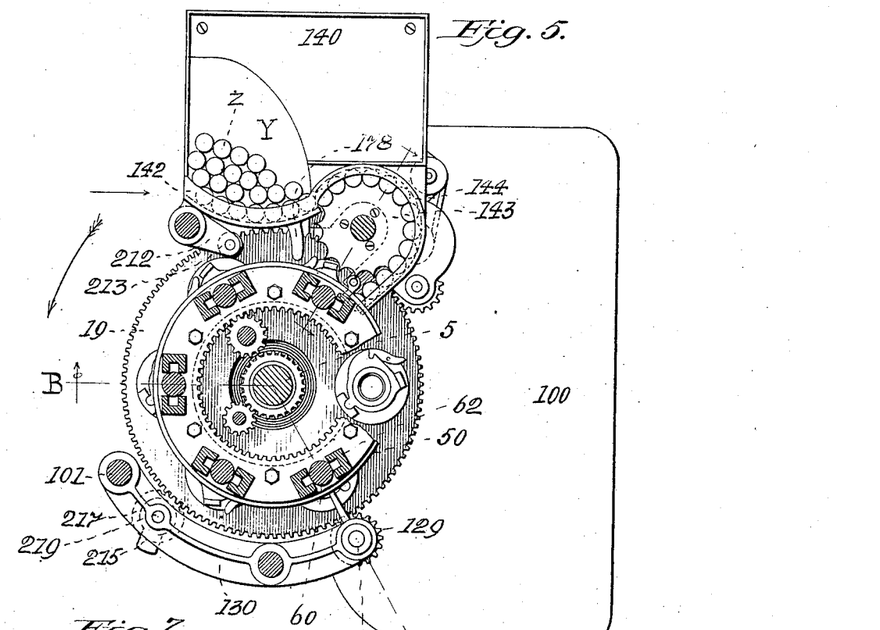
Fig. 5 is a horizontal section of Fig. 1, taken on the line E E.

By referring again to Fig. 10 it will be seen that the upper cam 27 is provided with a second rotary shaft 52, having at its upper end a pinion 53 in mesh with the driving spur-wheel 40 and at its lower end another pinion 54, and by reference to Fig. 5 it will be seen that the last-named pinion is in mesh with the teeth on the inner circumference of the turret-head 50. It follows, therefore, that the rotation of the driving-shaft in addition to causing the rotation of the sealing-heads effects the rotation of the turret-head and through that device the rotation of the turret.

Figure 2:
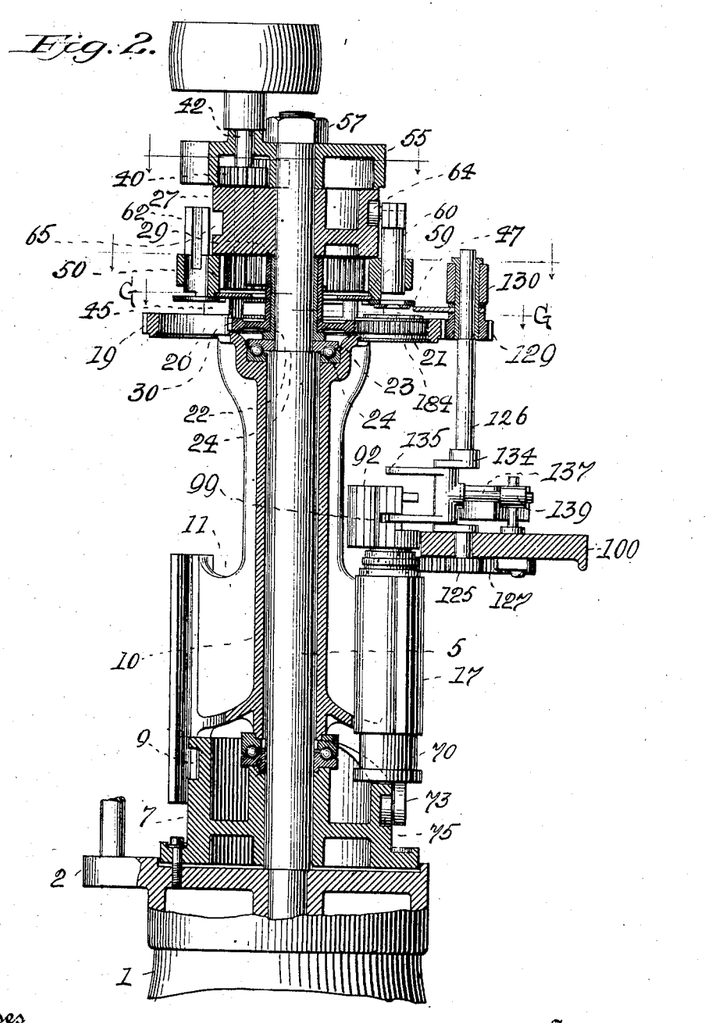
Fig. 2 is a vertical section of Figs. 3, 4, and 5, taken on the line B B with certain parts thereof omitted.
Figure 6:
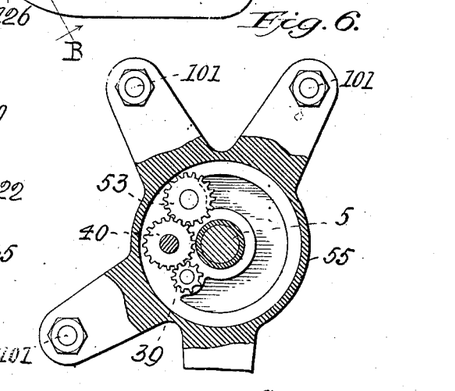
Fig. 6 is a horizontal section of Fig. 1, taken on the line F F.

By reference to Figs. 2 and 6 it will be seen that the gear-wheels 39, 40, and 53 are inclosed within a recessed cap 55, which is held tightly in contact with the upper surface of the upper cam 27 by means of a nut 57 at the end of the fixed central shaft 5, and that the bearing for the driving-shaft 42 is formed in a boss constituting a part of the crown portion of the cap. A ring 59, (see Fig. 2,) interposed between the annular plate 47 and the under side of the turret-head, serves as means to prevent oil used to lubricate the gearing within the turret-head from coming in contact with the sealing-heads by conducting it to the plate portion of the gear-wheel 30 and, if the plate is perforated, to the ball-bearing beneath.

Figure 8:
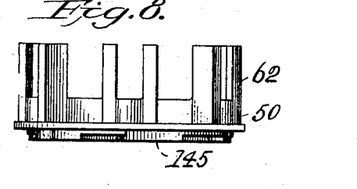
Fig. 8 is an elevation of the turret-head.

60 60 are plungers adapted to have a vertical reciprocating movement in holes 61 in the turret-head 50 and also in the holes 63 in the annular plate 47, all of which are in vertical alinement with the sealing-heads 21. These plungers are winged and guided, as shown in Figs. 2, 5, and 8, by means of grooved lugs 62 on the upper face of the turret-head, and they are provided with rollers 64 at their upper ends which rest in the cam-slot 65 of the upper cam 27, as shown in Fig. 2.

Figure 11:
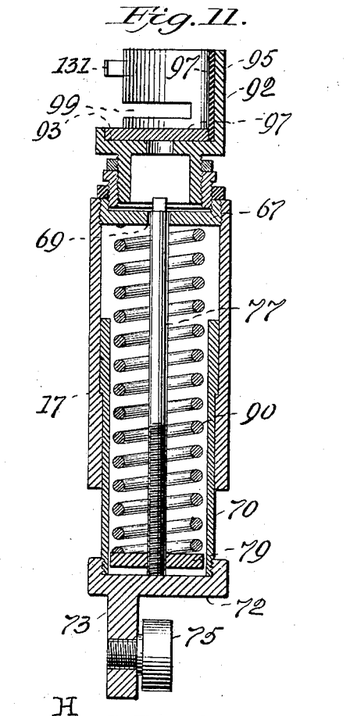
Fig. 11 is an enlarged vertical section taken on the line H H, Figs. 12 and 13, of a bottle supporting and carrying device.

One of the winged cylinders 17, before briefly referred to as an element of a bottle-carrying device and as adapted to have a vertical sliding movement in the arms 11 of the turret, is shown in section in Fig. 11, and by reference to that figure it will be seen that into its upper end is screwed a flanged plug 67, having a central hole 69.

Still referring to Fig. 11, 70 is an inner cylinder arranged to slide within the one 17, and the extreme extensibility of the two cylinders is limited by counterboring the upper portion of the one 17, so as to produce a shoulder, and enlarging the corresponding part of the one 70 to fit the enlargement. The bottom of the inner cylinder 70 is screwed into a flanged plate 72, having a lug 73, extending from its lower side, carrying a roller 75, adapted to rest in the spiral cam-groove 9 in the lower cam 7.

77 is a rod extending loosely through the hole 69 in the flanged disk 67 down to the flanged plate 72, where it is provided with a circular nut 79.

90 is a spiral spring confined endwise between the nuts 79 and the flanged plug 67, which has the effect of making the two cylinders, which constitute a longitudinally-contractible device, yielding in certain circumstances, hereinafter described.

Figure 12:
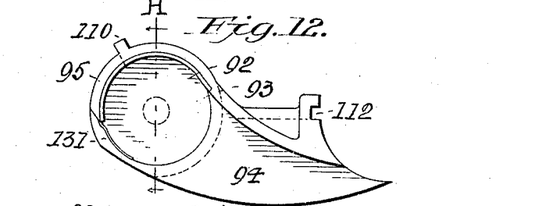
Fig. 12 is a plan view of the upper end of Fig. 11.

92 is a bottle-seat suitably secured to and made vertically adjustable with reference to the flanged plug 67. The bottom of this seat consists of a circular plate 93, (see Figs. 11 and 12,) which latter is a top view of Fig. 11, having a curved lateral extension 94, which serves as a support for bottles as they enter or leave the seat 92, as hereinafter described, and a segmental shell 95. The inner surface of this shell and that of the plate 93 are provided with a layer of some soft material 97 to form a cushion for the bottles. The shell is also provided with a horizontal slot 99 for the reception of a device, hereinafter described, to remove sealed bottles from the seat at the completion of the sealing operation.

The configuration of the cam-groove of the lower cam 7 is such that in the rotation of the turret 10 a bottle begins to rise almost immediately after its introduction into a bottle-seat and after reaching its highest position is maintained thereat for a considerable time and then made to assume its original or lowest position, and it is during this movement that a bottle is carried upward and into a sealing-cap previously placed for its reception and the flange of the cap turned under the shoulder formed by the bottle-head, as hereinafter particularly described. It will also be understood that in view of the employment of the spiral spring 90 the bottle offers a yielding resistance as its head is forced into contact with the crown of the cap.

Figure 1:
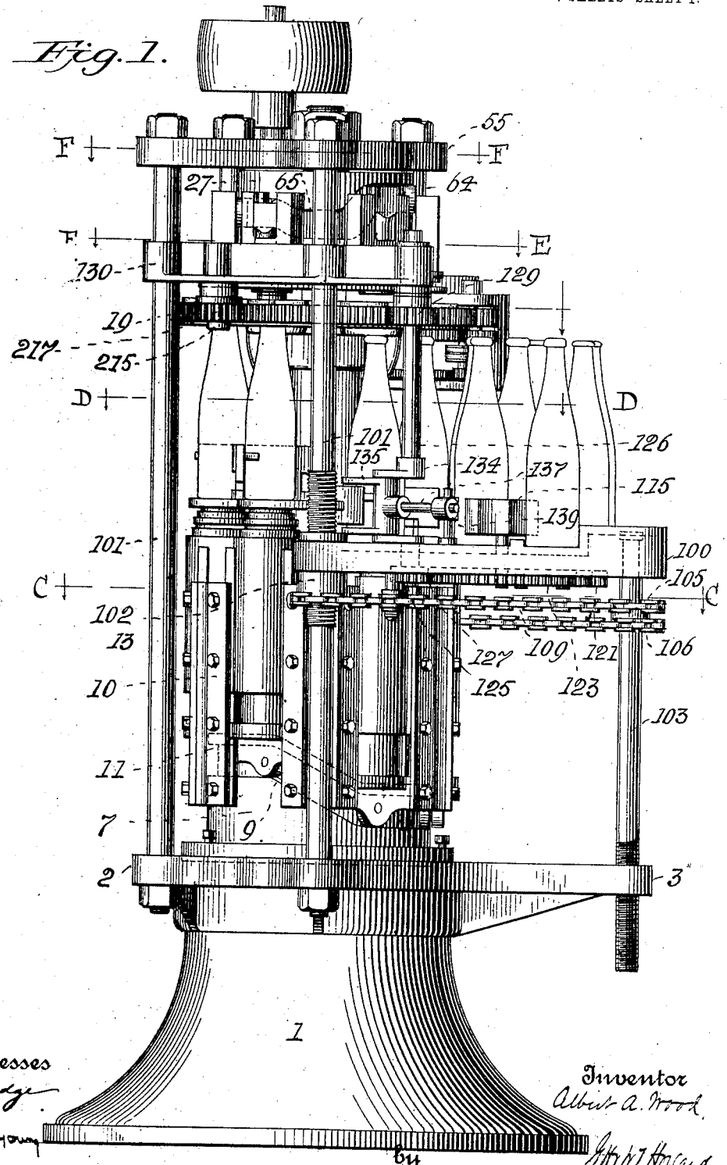
Figure 1 is an exterior elevation of the improved machine.

100 is the table upon which the bottles (denoted by X) to be capped or sealed are placed and which receives them after the completion of the sealing operation, and as the machine has to be adapted to seal bottles of different lengths or heights it follows, therefore, that as the sealing mechanism has a fixed vertical position the table must be adjustable in height. To effect this adjustment, two of the bars 101, which unite the lugs 2 of the columnar base 1 with the cap 55, are threaded (see Fig. 1) and provided with nuts 102, which extend loosely through holes in the table 100 and are fitted with collars, one above and the other below the table, so that should the nuts be rotated the table will be carried vertically with them.

The overhanging part of the table 100 is provided with a socketed loosely-turning and downwardly-extending bar 103, the lower end of which is threaded and screwed into the arm 3 of the base 1. All the threads just referred to are of a common pitch.

To the rod 103 are fastened two sprocket-wheels 105 and 106, and the nuts 102 have sprocket-wheels 107 and 108. All the sprocket-wheels have the same number of teeth.

By reference to Fig. 3 it will be seen that the sprocket-wheel 105 is united with the one 108 by a suitable sprocket-chain 109, and the sprocket-wheel 106 with the one 107 by a similar chain. With this arrangement the table may be raised or lowered by drawing either of the sprocket-chains or by rotating the threaded bar 103.

To prevent the bottle-seats 92, which are screwed into the flanged plugs 67, from turning and becoming displaced, each shell 95 is provided with a tongue 110 and its extension 94 with a grooved lug 112, (see Fig. 12,) and in assembling the parts the tongue of one seat will rest loosely in the groove of an adjoining one. (See Fig. 4.) This interlocking of the bottle-seats does not, however, interfere in any manner with their independent vertical motion.

Figure 4:
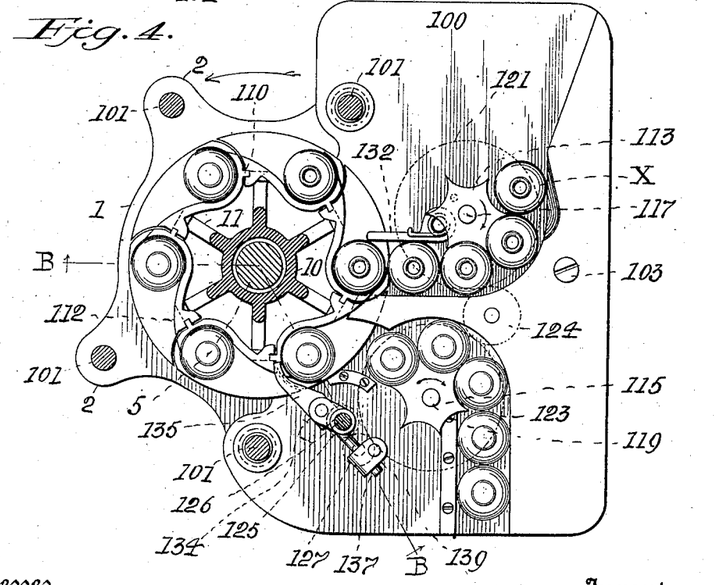
Fig. 4 is a horizontal section of Fig. 1, taken on the line D D.

By reference to Fig. 4 it will be seen that the portions of the table 100 upon which the bottles to be sealed are placed to be transferred to the bottle-seats and to which the bottles are delivered after the sealing operation are depressed, the curved projections thereby produced in connection with certain other devices hereinafter described serving as guides for the bottles in their passage to and from the bottle-seats.

The means for moving the bottles from the table 100 to the lateral extensions 94 of the bottle-seats, and thence to the seats proper, and from the said seats again and the table, consist of the star-wheels 113 and 115, secured, respectively, to the vertical shafts 117 and 119, having at their lower ends the spur-wheels 121 and 123. (Shown in Fig. 4 in dotted lines.) These spur-wheels are in mesh with an idler 124, and the one 123 is driven by the pinion 125 on the shaft 126 through the medium of an idle wheel 127. (Shown particularly in dotted lines in Fig. 4 and in full lines in Fig. 1.) The shaft 126 extends through the table 100 and receives its rotary movement from the toothed disk 19 by means of the pinion 129. (See Figs. 1 and 5.) The bearing for the upper end of the shaft 126 is in a segmental frame 130, (see Figs. 1 and 5,) supported from two of the bars 101, as shown in the said figures.

Figure 13:
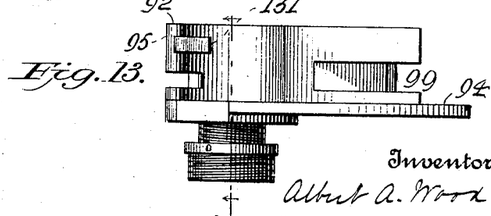
Fig. 13 is an exterior side view of Fig. 12.

131 is a curved spring (see Figs. 11, 12, and 13) to yieldingly retain the bottles in the seats.

132 (see Fig. 4) is a spring-held arm to direct the bottles to the bottle-seats after they have left the star-wheel 113. This device does not interfere with the revolution of the bottles in common with their seats.

To disengage the bottles from their seats and deliver them to the table 100 and to contact with the star-wheel 115 after the completion of the sealing operation, the shaft 126, at a point above the table, is provided with a crank 134, (see Figs. 1 and 4,) to the pin of which is provided a bifurcated finger 135, having a tailpiece or stem 137, which slides in a lug 139, pivoted to the table. At each rotation of the shaft 126 the bifurcated finger 135 is given a sweeping movement which carries a bottle from its seat to the star-wheel 115.

Figure 21:
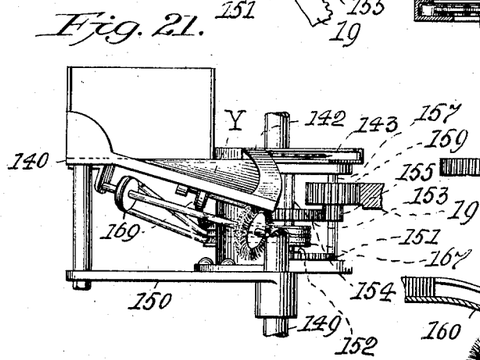

140 is a small table supported in any suitable manner, upon which sealing-caps (denoted by Z in Fig. 5) are placed to be fed to the holes in the annular plate 47, which register with the plungers 60. A portion of the table 140 (denoted in Fig. 5 by Y) is inclined downward toward the center of the machine, as illustrated in Figs. 5 and 21, in order that when the caps are pushed thereon by hand they will have a natural tendency to slide down into a curved runway 142. This runway extends to and terminates in a reversed curved channel 144, leading to the upper surface of the annular plate 47.

Figure 9:
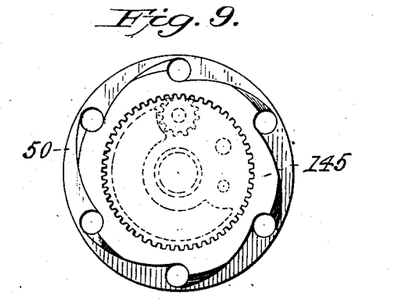
Fig. 9 is an under side view of the turret-head.

The movement of the sealing-caps along the channel 144 is effected by the notched feed-wheel 143, (shown in Fig. 5,) which conducts them to the notched carrier 145, formed on the under side of the turret-head 50 and shown particularly in Figs. 8 and 9, the latter being an under side view.

The carrier 145 delivers the sealing-caps to the holes 63 in the annular plate 47 and underneath one of the plungers 60, where they are temporarily supported by devices hereinafter described.

Figure 20:
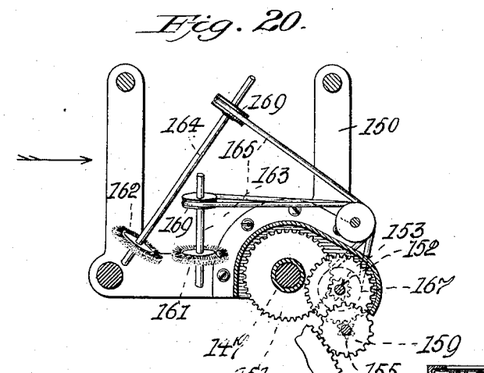
Figs. 20, 21, 22, 23, and 24 are details of the sealing-cap-feeding mechanism, the last three figures being enlarged.
Figure 22:
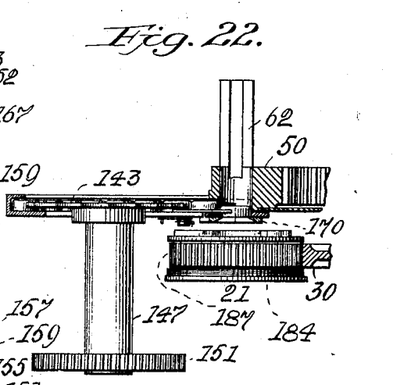

To provide for the rotation of the notched feed-wheel 143, an edge view of which is shown in Figs. 21 and 22, that device is fastened to a sleeve 147, adapted to turn loosely on a stud 149, secured to a suitable framework 150, shown only in Figs. 20 and 21 as projecting from the under side of the sealing-cap table 140.

At the lower end of the sleeve 147 is a tight spur-wheel 151 in mesh with a pinion 152 on a shaft 153. The shaft 153 has also a spur-wheel 154 in mesh with a pinion 155 on a shaft 157, which carries a spur-gear 159 in mesh with the teeth on the periphery of the disk 19, which constitutes its driver. Fig. 21 is a view of Fig. 20, looking in the direction indicated by an arrow in that figure.

Figure 23:
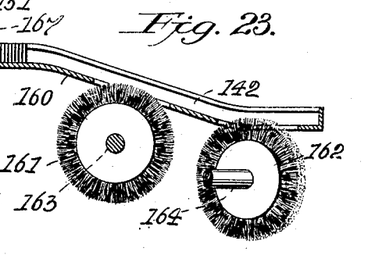
Figure 24:
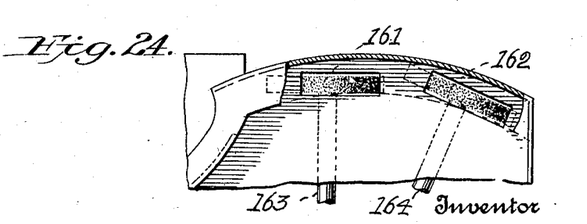

To enforce a feed movement of the sealing-caps in the runway 142, (see Figs. 20, 21, 23, and 24,) its lower plate 160 is provided with two apertures, Figs. 23 and 24, through which project the rotary circular brushes 161 and 162 on shafts 163 and 164, respectively, and these shafts are driven by the system of belts 165, leading from the pulleys 167 on the shaft 153 to the pulleys 169 on the brush-shafts. The shafts 163 and 164 are suitably supported under the table 140.

Figures 16, 17, 18, 19:
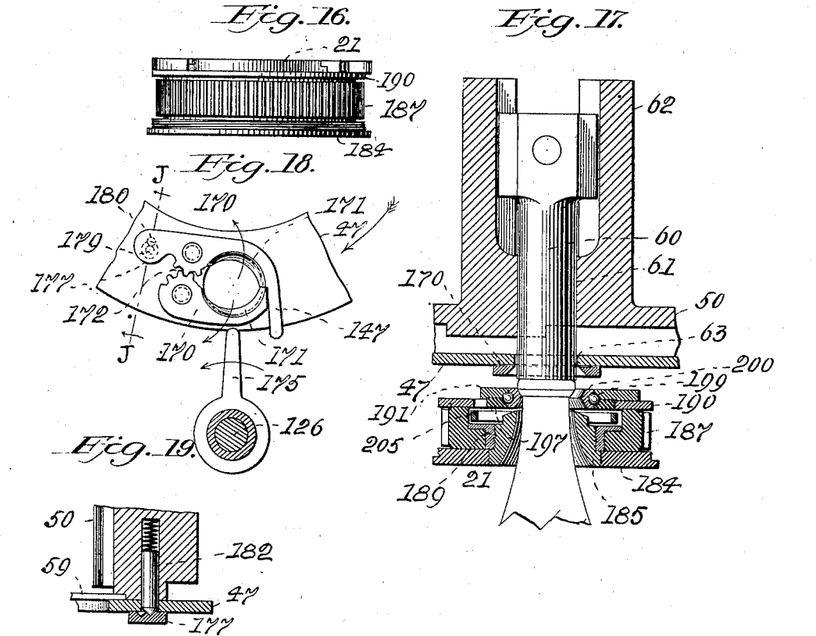
Fig. 16 is an exterior side view of the said head looking in the direction indicated by the arrow in Fig. 14.
Fig. 17 is an enlarged vertical section of a portion of the turret-head and the cap closing or sealing head, the section of the latter being taken on the line I I, Fig. 15.
Figs. 18 and 19 are enlarged details of the machine, the latter being a section taken on the line J J, Fig. 18, looking in the direction indicated by the arrow.

By reference to Fig. 18, which is an under side view on an enlarged scale of a part of the annular plate 47, and to Fig. 17 it will be seen that under each of the holes 63 in the annular plate 47 are two hinged cap-supporting plates 170 with hollow downwardly-flared faces 171 and teeth 172, which are in mesh, so that any inward or outward movement of either plate causes a corresponding movement of the other. One of these plates is provided with a tailpiece 174, which, in circumstances hereinafter described, interferes with a fixed or stationary finger 178, (shown in Fig. 5,) such interference having the effect of opening or separating the plates for a purpose hereinafter specified. 175 is a finger on the shaft 126, which in its rotation strikes the outer plate 170 and forces it in, thereby closing both plates, as shown in Fig. 18.

What may be termed the "normal" position of the hinged cap-supporting plates 170 is one in which the extreme distance between their curved faces 171 is less than the diameter of a sealing-cap. Consequently when in such position they serve to support the sealing-caps while the same are in the holes 63.

By reference to Figs. 18 and 19 it will be seen that the hinged plate 170, which is provided with the tailpiece 174, has an extension 177 with two conical depressions 179 and 180 in its under surface, and the turret-head is provided with a spring-pressed bolt 182, having a conical point adapted to enter either of the said depressions. When the spring-plates 170 are fully opened or distended, the point of the bolt 182 will enter the depression 180 and when the same are closed the said point will rest in the depression 179, as shown in Fig. 18, the spring-bolt being elevated in the movement of the extension 177. The principal object of this construction is to retain the pivoted plates 170 when separated by the passage between them of a bottle-head, as the same moves upward into a sealing-cap, in an open or distended condition until the head of the sealed bottle is brought down from the sealing-head by the combined action of the two cams and a plunger and the end of the said plunger has ascended to a position above the plate 47. When this condition of the various parts has been reached, the plates 170 are closed by one of them being struck by the finger 175, before described as rotating with the pinion 129. (Shown in Figs. 3 and 5.)

While it is intended that a bottle will be placed on each seat as it comes to the front of the machine, it is possible that occasionally this may not be accomplished and an empty seat pass around, and as the upward movement of a bottle-head is depended upon to separate the cap-supporting plates 170 the missing of a bottle would result in a plunger subsequently coming into contact with their upper surface. To avoid this, there is placed in the path of the tailpiece 174 a fixed finger 178, before briefly referred to and shown only in Fig. 5, which performs the office of a bottle in this respect and prevents injury to the machine.

Figures 14, 15:
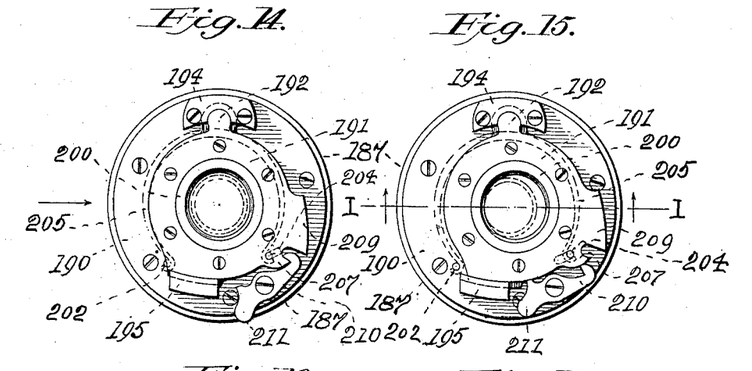
Figs. 14 and 15 are enlarged top views of a cap closing or sealing head illustrating the independently-moving parts thereof in different positions.

One of the sealing-heads, before briefly referred to and denoted as an entirety by 21, is well shown in Figs. 14 and 15, which are top views of that device, in Fig. 16, which is an exterior side view, and in Fig. 17 wherein the sealing-head is shown in section together with the upper end of a bottle, the annular plate 47 with the hinged cap-supporting plates 170, a part of the turret-head 50, and one of the plungers 60.

A sealing-head comprises a threaded disk 184, which is screwed tightly into one of the apertures 20, (see Figs. 2 and 7,) the flaring throat-piece 185, screwed into said disk, and the rotary exteriorly-toothed annulus 187, which is seated on the disk 184 and held in place by the flanged bushing 189, screwed over the throat-piece 185, around which it rotates.

Still referring to the sealing-head, 190 is an annular plate fastened to the upper surface of the toothed annulus 187, so as to rotate with it. 191 is a ring-plate having a semicircular flanged projection 192 at one edge thereof, which enters a recess in a lug 194 to form a pivot. The withdrawal of the projection 192 from the lug 194 is prevented by the rabbeted lug 195, which laps over the edge of the ring-plate and is fastened to the annular plate 190. To the under side of the ring-plate 191 is fastened another plate 197, and the inner edge of the combined plates is grooved to form a race for the antifriction-balls 199. The corresponding race is formed in a hardened ring 200, the inner diameter of which is greater than that of a bottle-head. By reference to the cross-section of this ring (shown in Fig. 17) it will be seen that its inner face or edge is made practically V-shaped or of a shape which if the ring is forced tightly against the circumference of the flange of a sealing-cap while the same is held on a bottle-head will indent it and bring the indentation under the shoulder formed by the projection of the bottle-head beyond its neck. Now should the sealing-head be in rotation when the indentation is produced it follows that the said indentation will be continued entirely around the flange of the cap and that device firmly affixed to the bottle. The rotation of the sealing-head to effect this result is caused by the meshing of the teeth of the annulus 187 with those of the rotary gear-wheel 30. (Shown in section in Fig. 2.)

Referring again to Figs. 14, 15, and 17, it will be seen that to retain a part of the inner circumference of the indenting-ring 200 with a yielding pressure against the flange of the sealing-cap the inner surface of the annular plate 190 and the corresponding surface of the ring-plate 191 are provided, respectively, with the pins 202 and 204, (shown in Figs. 14 and 15,) and these pins are united by the compressed horseshoe-spring 205, shown in dotted delineation in those figures and in cross-section in Fig. 17. The ring-plate 191 has also a hook 207 and an inclined projection 209, (see Figs. 14 and 15,) and the annular plate 190 is furnished with a hinged latch 210, having a tailpiece 211 arranged to engage with the former and hold the ring-plate in the central position, (shown in Fig. 14,) in which the sealing or indenting ring 200 is inoperative, it being concentric with the throat-piece 185.

Referring to Fig. 5, 212 is a stationary arm carrying a roller 213 on a stud projecting from the sealing-cap table 140, which roller in the operation of the machine passes over the inclined projection 209 to the latch and if the latter device is in the position shown in Fig. 14 strikes its tailpiece 211 and forces it inward, thereby detaching the latch from the hook 207, when the sealing-ring 200 becomes operative to affix the sealing-cap to the bottle. Still referring to Fig. 5, 215 is an arm projecting laterally from a pinion 217 on a stud 219, dependent from the under side of the segmental frame 130. This pinion is in mesh with the teeth on the periphery of the disk 19. The arm 215 in its rotation comes in contact with the inclined lug 209 on the vibratory ring-plate 191 and by the friction thereby produced retards the movement of the said plate sufficiently to cause the latch 210 to reëngage with the hook 207. The latch may be spring-held; but it is preferred that its actual engagement with the hook shall be effected by the arm 215 after it has passed over and from the inclined lug 209.

To arrange the machine for operation, the bottle-table 100 is placed at such a height that the heads of the longest or tallest bottles of the kind to be sealed when placed thereon will be slightly below the under surface of the sealing-heads 21. The bottle-seats 92 are then adjusted so that when they are in their lowest position the upper surface of their extensions 94 will be fair with or in horizontal alinement with that of the bottle-table 100. Unsealed bottles are then placed on the table 100, as shown in Fig. 4, and the table 140, including the runway 142 and the channel 144, provided with a supply of sealing-caps with their flanges down, as shown in Fig. 5. The machine is now put in operation, when a sealing-cap is deposited by the mechanism before described in a hole 63 in the annular plate 47 and seated on the closed hinged cap-supporting plates 170 beneath a plunger 60, which is at that time in its highest position. The bottles are then fed forward, and the first bottle of the row enters the seat of a bottle-carrier. The bottle in beginning its revolution around the center of the machine moves on the same level for about fifteen degrees and then begins to rise, and this elevation continues until the bottle-head has passed through the sealing-head 21, the centralized and locked vibratory ring-plate 191, between the pivoted cap-supporting plates 170, which separate for the purpose, and through the annular plate 47 into the sealing-cap, which is prevented from rising by the plunger 60. In this movement the spring 90 in the bottle-carrier is slightly compressed, the degree of compression depending upon variation in height of the bottles. After the bottle has revolved about sixty degrees from its starting-point the plunger 60 begins to descend, which forces down the bottle and cap and further compresses the spring 90 until the bottle-head is in the position in which it is shown in Fig. 17. After the bottle has traversed about one hundred and ten degrees from the starting-point the tailpiece 211 of the latch 210 comes into contact with the roller 213, which liberates the previously-locked pivoted ring-plate 191 and allows the inner circumference of the indenting-ring 200 to bear with spring-pressure against the flange of the sealing-cap.

It will be remembered that the ring-plate is pivotally attached to the annular plate 190, which in turn is fastened to the constantly-rotating toothed annulus 187. Consequently the indentation produced in the flange of the cap is continued until it extends around its entire circumference.

In the operation of the machine, the hardened indenting-ring performs three complete rotations before the inclined lug 209 comes in contact with the rotating arm 215, which has the effect of retarding the movement of the ring-plate sufficiently to enable the latch 210 to again engage and interlock with the hook 207, which puts the ring-plate out of service. The relocking of the ring-plate takes place when the bottle has moved about two hundred and thirty degrees from the starting-point.

The roller 75 at the bottom of the bottle-carrier now passes to the downward incline of the lower cam 7, and the sealed bottle descends to its lowest or original position, its movement being enforced by the plunger 60, which again becomes a moving device. This second downward movement of the plunger 60 is only for the purpose of preventing accident due to a deformed or over-sized bottle-head becoming caught in the throat-piece of the sealing-head.

The bottle reaches its lowest position when it has traversed about two hundred and eighty degrees and soon after reaching that point is swept from its seat to the delivery portion of the table 100 and into contact with the discharging star-wheel 115 by the bifurcated finger 135, as before described.

Immediately before the discharge of the sealed bottle the hinged cap-supporting plates 170, which were separated or opened by the passage between them of the bottle-head, are closed by the outer plate of the cap-supporting plates 170 coming in contact with the rotating finger 175, as before explained, and thereby placed in a proper condition to receive another unsealed bottle-head.

I claim as my invention—

1. In a machine for sealing bottles, a rotatable sealing-head whereby the pendent flange of a sealing-cap is turned in and under a shoulder on a bottle, which comprises a flange-indenting ring into which the bottle-head carrying an unfastened sealing-cap is inserted, with means to force the same into an eccentric position with respect to the flange of the sealing-cap and in indenting contact therewith, combined with devices to hold the sealing-cap on the bottle-head during the indenting operation, mechanism to rotate the sealing-head about the bottle whereby the indentation produced by the indenting ring is made to extend entirely around the flange of the sealing-cap, and appliances to replace and hold the said indenting-ring concentric with and from contact with the flange of the sealing-cap at the completion of the sealing operation, substantially as specified.

2. In a machine for sealing bottles, mechanism whereby the pendent flange of a sealing-cap is turned in and under the head of a bottle, which comprises appliances to convey a sealing-cap to and sustain it in a position directly over the bottle-head, and other appliances to lift the bottle-head into the sealing-cap, a flange-indenting ring with means to force the same yieldingly into an eccentric position with respect to the flange of the sealing-cap and into indenting contact therewith, mechanism to gyrate the indenting-ring about the bottle whereby the indentation produced by the indenting-ring is made to extend entirely around the flange of the sealing-cap, combined with devices to return the indenting-ring to a concentric position with respect to the bottle-cap and lock the same, and other means to bring the sealed bottle down and from the centralized indenting-ring at the completion of the sealing operation, substantially as specified.

3. In a machine for sealing bottles, the combination of a series of sealing-heads which revolve around a common center, and rotate on their axes during the revolution, a series of bottle-carriers situated beneath the sealing-heads and in vertical alinement therewith, and actuating mechanism whereby the bottle-carriers during their revolution are moved toward and from the sealing-heads, substantially as specified.

4. In a bottle-sealing machine, the combination of a rotary turret carrying a series of vertically-sliding bottle-carriers terminating at their upper ends in bottle-seats, a table upon which unsealed bottles are placed, with mechanism whereby the bottles are conducted to the said seats and discharged therefrom, and actuating mechanism whereby in the rotation of the turret the bottle-seats together with bottles placed thereon are given a vertical reciprocating movement, a turret-head situated above and having a rotary motion in common with the turret, the said turret carrying rotary sealing-heads substantially as described, which sealing-heads are in vertical alinement with the bottle-seats, into which sealing-heads the heads of the bottles are introduced and from which they are withdrawn while the same are performing a single revolution around a common center, substantially as specified.

5. In a machine for sealing bottles, the combination of a rotary turret carrying a series of rotary sealing-heads, substantially as described, plungers with means to effect their up-and-down movement within the rotating sealing-heads, a table for sealing-caps, cap-supporting devices situated beneath the said plungers and suitable feeding mechanism, to transfer the sealing-caps from the table to the cap-supporting devices and beneath the plungers as they reach a certain point in their revolution around a common center, substantially as specified.

ALBERT A. WOOD.

Witnesses:
OREGON MILTON DENNIS,
WM. T. HOWARD.